(No Model.) 2 Sheets—Sheet 1.
G. F. SIMONDS.
BALL BEARING.
No. 434,473. Patented Aug. 19, 1890.
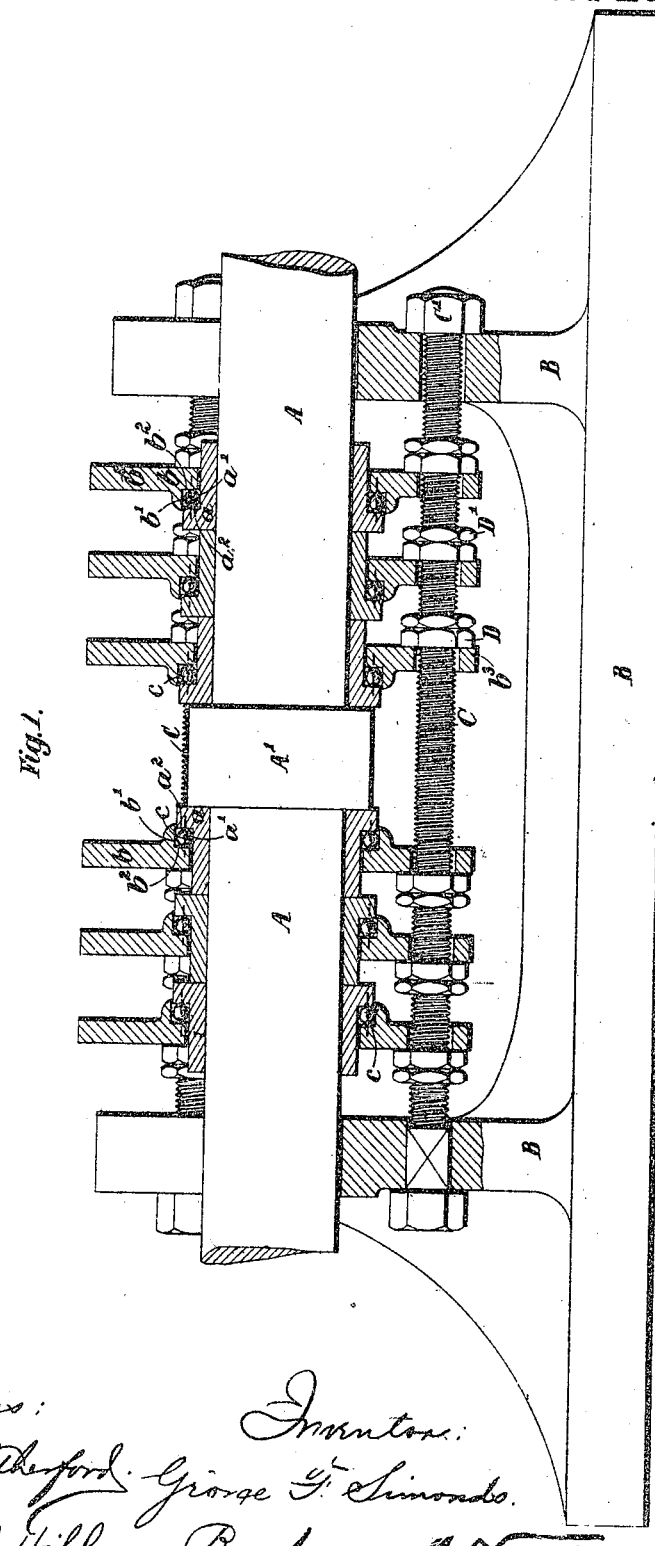

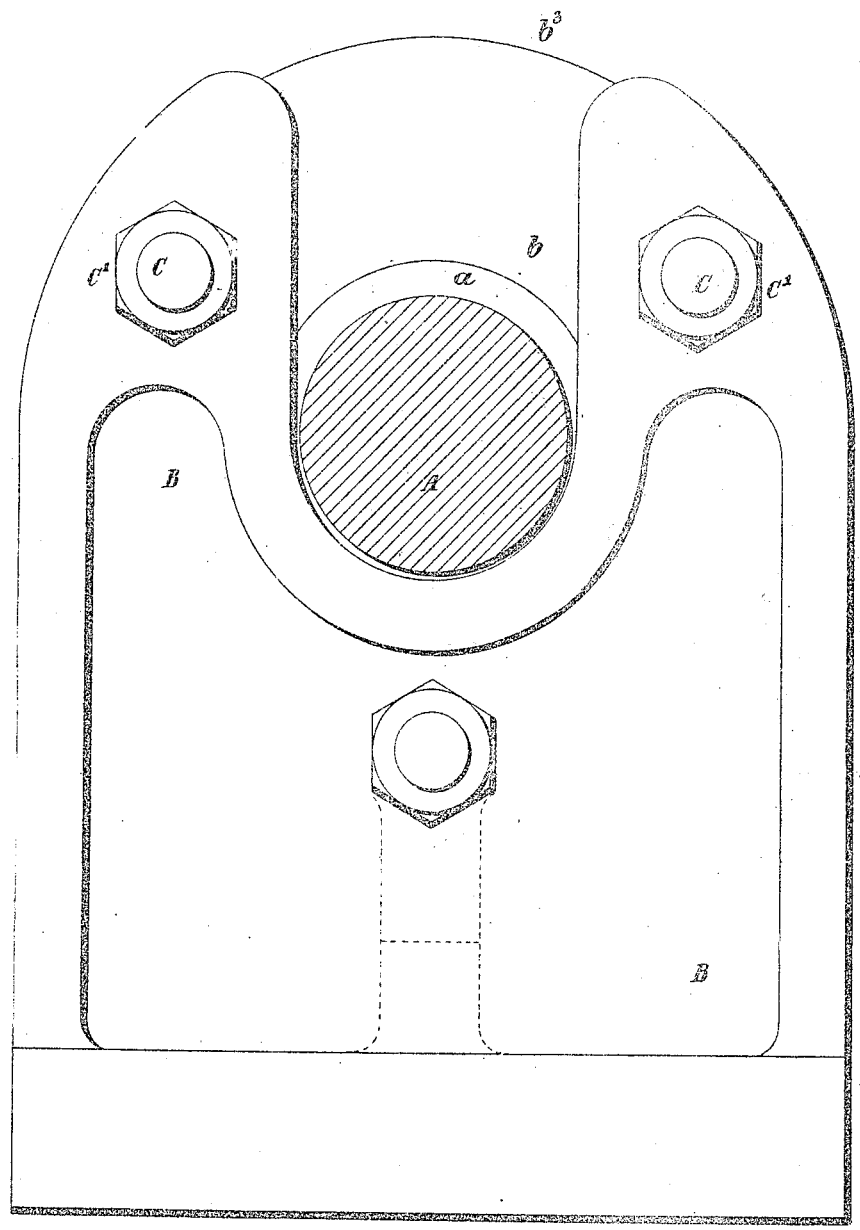

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,473, dated August 19, 1890.

Application filed January 2, 1890. Serial No. 335,693. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to thrust or end-pressure bearings in which circular series or groups of spherical rollers or balls are employed to diminish the friction.

My said invention is chiefly designed to provide simple and efficient means for transmitting the thrust of screw-propellers to steamships; but my improvements are also applicable to thrust or end-pressure bearings for other purposes.

In making a thrust-bearing according to my present invention I provide a suitable collar on the propeller or other shaft, and I arrange on each side of this collar any desired number of pairs of inner and outer rings or annular pieces provided with concentric surfaces and plane surfaces, between which are annular channels or cavities wherein the balls are arranged in circular series or groups, one of the said concentric surfaces and one of the said plane surfaces being formed on each of the said rings or annular pieces.

An important feature of my present invention is the combination, with the inner and outer rings having the balls arranged between their concentric and plane surfaces, of improved means whereby the outer rings may be adjusted relatively to the inner rings to bring the balls to a bearing against the said plane surfaces. I so construct the bearing that the outer ring of each pair can be adjusted independently of those of the other pairs.

Another important feature of my said invention is the construction and arrangement of the parts of the bearing in such a manner that either of the outer rings can be moved longitudinally upon the corresponding inner ring through a sufficient distance to permit the removal and replacing of the series or group of balls between them without disturbing the other parts of the bearing.

In the accompanying drawings, Figure 1 is a side elevation, partly in vertical longitudinal central section; and Fig. 2, an end elevation, partly in transverse section, drawn to an enlarged scale, showing a convenient and advantageous form of my improved thrust-bearing.

A is the shaft, which is provided with a fixed collar A'.

B is the base or pedestal of the bearing. $a$ $b$ are the inner and outer rings or annular pieces.

$c\ c$ are the spherical rollers or balls, which are arranged in circular series or groups between the said rings. It will be seen that the surfaces $a'\ b'$ of each pair of rings are concentric with each other and with the shaft A, and that the plane bearing-surfaces $a^2\ b^2$ of each pair of rings are parallel to each other and perpendicular to the said concentric surfaces. The direction of the pressure upon the balls $c\ c$ is indicated more clearly by dotted lines passing through the points of contact of the balls with the said surfaces. The balls $c$ roll upon the bearing-surfaces $a^2\ b^2$ when the shaft is rotated, the concentric surfaces $a'\ b'$ merely serving to retain the balls in place and being arranged at such a distance apart that the balls can work freely between them. By employing the said rings or annular pieces having the bearing-surfaces thereon, as above described, I am enabled to conveniently and advantageously harden or temper and finish the said surfaces before the parts of the bearing are put together.

C C are screw-bolts, which extend through holes in the pedestal B, and also through holes in lugs or flanges $b^3$ on all of the outer rings $b$. These bolts are firmly secured in the pedestal by means of nuts C', and are thus restrained from endwise motion relatively to the said pedestal and to the rings $b$. On the said screw-bolts, in combination with each outer ring $b$, are arranged adjusting-nuts D and locking-nuts D', whereby the said ring may be accurately adjusted relatively to the corresponding inner ring $a$ to bring the balls $c$ to a bearing against the surfaces $a^2\ b^2$ or to compensate for wear, and may be firmly locked in any position to which they may be adjusted. Each ring $a$ is preferably made, as shown, of such length that the corresponding ring $b$ can be moved longitudinally thereon through a sufficient distance to permit the withdrawal of the balls from the channel or cavity between the said wings and the replacing of the said balls therein without the necessity for taking the entire bearing to pieces or otherwise disturbing the other parts of the bearing.

The outer rings $b$ are preferably so formed that when they are in place their surfaces $b'$ project more or less beyond the plane surfaces $a^2$ of the inner rings $a$, as shown, and thus prevent the entrance of dust or other foreign matter into the channel or cavity between the said rings. This arrangement is not, however, absolutely necessary.

Certain features of construction shown and described but not claimed in this application are shown, described, and claimed in application Serial No. 331,639 filed by me.

What I claim is—

1. A thrust or end-pressure bearing in which spherical rollers or balls are arranged between rings or annular pieces provided with plane bearing-surfaces, and with concentric surfaces, which retain the balls in place, but do not serve as bearing-surfaces, the outer rings being adjustable separately or independently of each other relatively to the inner rings, for the purpose above specified.

2. A thrust or end-pressure bearing comprising inner rings, each provided with a concentric surface, and with a plane bearing-surface perpendicular thereto, outer rings provided with corresponding concentric and plane surfaces and separately adjustable longitudinally upon the corresponding inner rings, and spherical rollers or balls arranged between the said inner and outer rings, substantially as and for the purposes above specified.

3. A thrust or end-pressure bearing comprising inner rings fixed upon a shaft at one side of a collar thereon and each provided with a concentric surface, and with a plane bearing-surface perpendicular thereto, similar rings fixed upon the said shaft at the other side of the said collar, outer rings provided with corresponding concentric and plane surfaces and adjustable separately or independently of each other relatively to the corresponding inner rings, and spherical rollers or balls arranged between the said inner and outer rings, substantially as and for the purposes above specified.

4. A thrust or end-pressure bearing comprising inner rings fixed upon a shaft at one side of a collar thereon and each provided with a concentric surface, and with a plane bearing-surface perpendicular thereto, similar rings fixed upon the said shaft at the other side of the said collar, outer rings adjustable longitudinally upon the said inner rings and provided with corresponding concentric and plane surfaces and with lugs or flanges, spherical rollers or balls arranged between the said inner and outer rings, screw-threaded rods or bolts extending through holes in such lugs or flanges and restrained from endwise motion relatively thereto, and screw-nuts on the said rods or bolts, whereby the said outer rings may be adjusted separately or independently of each other relatively to the said inner rings, substantially as and for the purposes above specified.

5. In a thrust or end-pressure bearing, the combination of inner rings fixed upon a shaft and each provided with a concentric surface, and with a plane bearing-surface perpendicular thereto, outer rings provided with corresponding concentric and plane surfaces, and each adjustable longitudinally upon the corresponding inner ring, and spherical rollers or balls arranged between the inner and outer rings, each of the said outer rings being adjustable through a sufficient distance to permit the removal of the balls from the channel or cavity between the said rings and the replacing of the said balls therein without disturbing the other parts of the bearing, substantially as above specified.

6. In a thrust or end-pressure bearing wherein spherical rollers or balls are arranged between concentric surfaces and plane bearing-surfaces formed on inner and outer rings or annular pieces, the combination, with outer rings provided with lugs or flanges, of screw-threaded rods or bolts extending through holes in such lugs or flanges and restrained from endwise motion relatively thereto, and screw-nuts on the said rods or bolts, whereby the said outer rings may be adjusted separately or independently of each other relatively to the said inner rings, substantially as and for the purposes above specified.

7. In a thrust or end-pressure bearing, the combination of an inner ring fixed upon a shaft and provided with a concentric surface and with a plane bearing-surface perpendicular thereto, an outer ring provided with corresponding concentric and plane surfaces, the concentric surface on the outer ring being so formed that when the rings are in place the said concentric surface will extend beyond the plane surface of the inner ring, and spherical rollers or balls arranged between the said inner and outer rings, substantially as and for the purpose above specified.

8. The combination, with a shaft provided with a fixed collar, of the inner rings $a$, provided with the concentric surfaces $a'$ and with the plane surfaces $a^2$ and fixed upon the said shaft on both sides of the said collar, the outer rings $b$, provided with corresponding concentric and plane surfaces $b'$ $b^2$ and with the lugs or flanges $b^3$, the spherical rollers or balls $c$, arranged between the said rings, the base or pedestal B, the screw-bolts C, secured in the said base or pedestal and extending through holes in the said lugs or flanges, and the nuts D upon the said screw-bolts for effecting the separate or independent adjustment of each of the rings $b$ relatively to the corresponding ring $a$, substantially as and for the purposes set forth.

9. In a thrust or end-pressure bearing, the combination of inner rings $a$ and outer rings $b$, having concentric surfaces $a'$ $b'$ and plane bearing-surfaces $a^2$ $b^2$, and balls $c$, arranged between the said surfaces, the rings $b$ being adjustable longitudinally upon the rings $a$ through a sufficient distance to permit the withdrawal and replacement of the balls, substantially as described.

In testimony whereof I have hereunto signed my name in the presence of two subscribing witnesses.

GEORGE FREDERICK SIMONDS.

Witnesses:
 DAVID YOUNG,
 CHAS. B. BURDON.